United States Patent [19]
McEwan et al.

[11] Patent Number: 5,691,922
[45] Date of Patent: Nov. 25, 1997

[54] GOLF AUTORANGING SYSTEM

[75] Inventors: Charles McEwan, Rancho Mirage; Michael Maietta, San Jose; Robert Pompeani, San Jose; Roberto Marcoccia, San Jose, all of Calif.

[73] Assignee: Airwave Technology, Inc., Campbell, Calif.

[21] Appl. No.: 557,218

[22] Filed: Nov. 14, 1995

[51] Int. Cl.⁶ ........................................ G01S 13/74
[52] U.S. Cl. ........................... 364/561; 364/410
[58] Field of Search ................... 364/561, 571.01, 364/571.02, 571.05, 569, 410; 342/42, 47, 118, 126, 125, 129, 173; 473/407, 131, 175

[56] References Cited

U.S. PATENT DOCUMENTS

| | | |
|---|---|---|
| 4,042,926 | 8/1977 | Anderson et al. .................. 342/173 |
| 4,136,394 | 1/1979 | Jones et al. . |
| 4,297,701 | 10/1981 | Henriques .......................... 342/42 |
| 4,480,310 | 10/1984 | Alvarez . |
| 4,703,444 | 10/1987 | Storms, Jr. et al. . |
| 5,056,106 | 10/1991 | Wang et al. . |
| 5,582,566 | 12/1996 | Imasaka et al. .................. 473/407 |

OTHER PUBLICATIONS

Breed, Gary A., "A First Introduction to Direct Sequence Spread-Spectrum," RF Design (Apr., 1994) 3 pp.
Dixon, Robert C., "Spread Spectrum Systems With Commercial Applications," (Third Edition), Chapter 8, Section 8.1, (John Wiley & Sons, Inc.) pp. 297–301.
Fakatselis, John; Petrick, Al, "System Considerations in Spread-Spectrum Designs," *Wireless Design & Development*, Apr. 1995, vol. 3, No. 4, 4 pp.

*Primary Examiner*—Emanuel T. Voeltz
*Assistant Examiner*—M. Kemper
*Attorney, Agent, or Firm*—Blakely Sokoloff Taylor & Zafman, LLP

[57] ABSTRACT

A golf ranging system is provided where a golfer positions a ranging unit at a ball position, indicates which hole is being played and the ranging unit reports the distance to the pin for that hole and/or the distance from the tee for that hole. The ranging signal is a direct sequence spread-spectrum signal and the ranging is repeated many times and an average taken, to improve the accuracy of the distance measurement. Optionally, the ranging system could operate over multiple frequencies to avoid interference. The multiple frequencies are scanned until an interference-free channel is found, or measurements are made at several frequencies and averaged. The pin unit might be housed just beyond the pin and include an offset to the pin. The offset can be set by simply sending an offset signal from a standard ranging unit, or a specially configured course management unit, held at the pin or manually entered via a serial port.

10 Claims, 9 Drawing Sheets

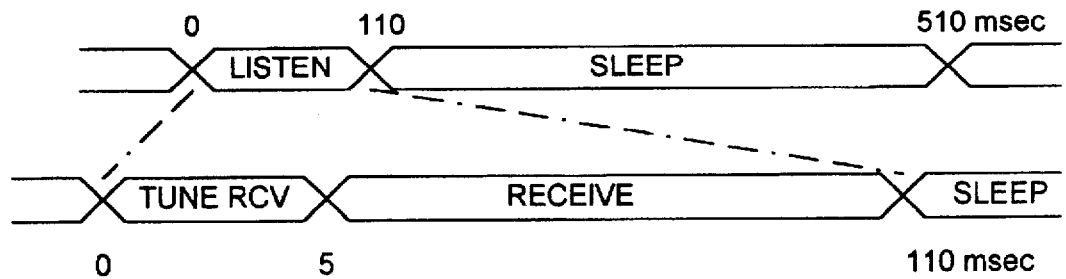
FIG. 10 Pin Unit Polling Timing
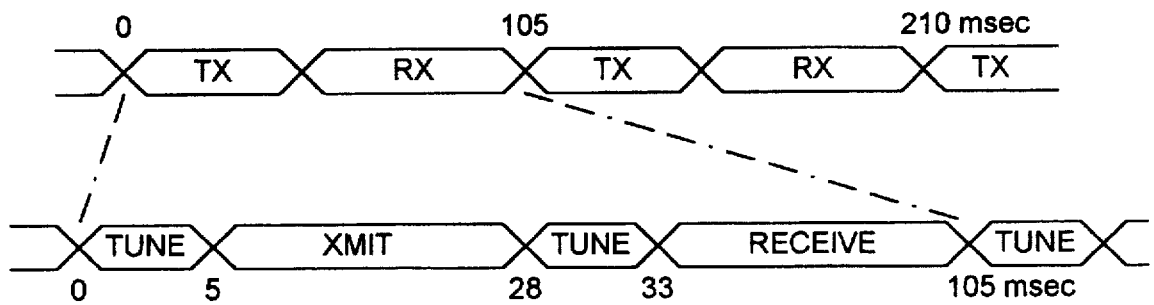
FIG. 11 Ranging Unit Handshake Timing
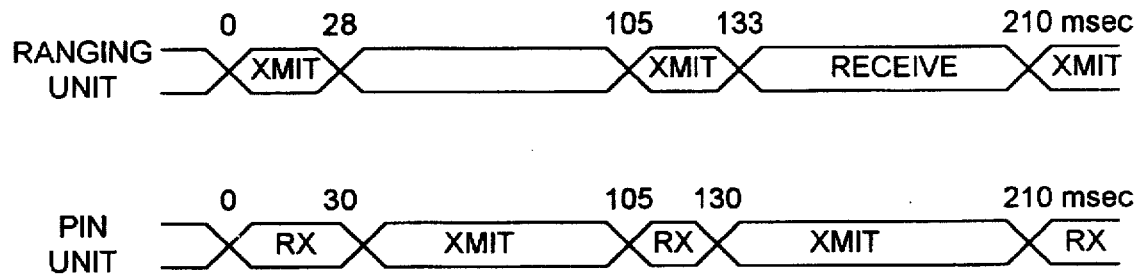
FIG. 12 Data Collection Timing

GOLF AUTORANGING SYSTEM

BACKGROUND OF THE INVENTION

The present invention relates to auto-raging devices. More specifically, the present invention provides an improved method and apparatus for auto-ranging on a golf course.

While golfing, golfers often need to know the distance from their ball to the pin, "pin" being the term for the hole which is the target of the golfer and into which a flagged pole is placed. The golfer uses the distance information to determine which club to use and how to hit the ball.

Many golf courses provide fixed yardage markers which indicate the approximate distance from the marker to the green. One disadvantage of fixed yardage markers is that they only measure the distance from the center of the green to the marker, leaving the golfer to guess how to account for the distance from the center of the green to the pin and from the ball's lie (i.e., the position from which the golfer will hit the ball) to the yardage marker. The distance from the pin to the center of the green can be eliminated as a problem by either placing the pin at the center of the green or placing the yardage markers relative to the pin instead of the center of the green. However, since the markers are fixed and the pin is generally moved around the green from time to time so as to not unevenly wear the green grass, the markers cannot be fixed relative to the pin. The distance from the golfer's ball position to the marker must be estimated, if the marker can be found. Even if the marker can be found, unless the marker, the pin and the ball are collinear, trigonometric calculations are required to determine the distance from the lie to the pin. To overcome these disadvantages, several ranging systems have been developed which are portable and can be carried to the ball position.

For example, U.S. Pat. No. 4,703,444 discloses a ranging system wherein three or more transmitters are placed around a golf course to transmit ranging signals to portable receivers carried by golfers. The receiver picks up the transmitted signals and, by triangulation, determines the location of the portable receiver (presumably positioned near the location of the ball of interest) relative to the transmitters. This relative information is then compared to a stored database of the locations of pins relative to the transmitters. Other objects, such as obstacles and tees are also stored in the database. The drawback to such a system is that the database must be updated as pins are moved around the green. Typically, management of the golf course's information system is handled by one department and the greens maintenance is handled by another department.

U.S. Pat. No. 4,136,394 discloses a pin-based transponder, but that transponder receives radio signals and transmits sonic signals. Thus, the transmitter is highly directional, requiring a complicated flag alignment mechanism on the flag and the cup to keep the transmitter pointed in the direction of the fairway. Such a distance measuring device, therefore, has limited usefulness outside of a line of sight of the pin. The transmitter emits a sonic signal in response to receipt of a radio signal. The radio signal is assumed to travel from the remote unit at the golfer's position to the base unit at the pin instantaneously and the time of flight of the sonic signal, assuming a constant speed of sound, is used to calculate the distance. The assumption of instantaneous radio flight is reasonable given the resolution of the system. Such a system is not adaptable to two-way radio communications however, because the assumption would always result in a zero time of flight.

Thus, what is needed is an improved method and apparatus for omnidirectionally measuring true distance to a pin.

SUMMARY OF THE INVENTION

An improved golf ranging system is provided by virtue of the present invention. In one embodiment, a golfer carries a hand-held ranging unit to a ball position, indicates which hole is being played if the ranging unit is not already aware of the hole, and the ranging unit reports the distance to the pin after receiving a response from a pin unit located under the cup for the pin or nearby, in an offset pin unit. The ranging signal is a direct sequence spread-spectrum signal and the ranging is repeated many times and an average is taken to improve the accuracy of the distance measurement. The ranging system could operate over multiple frequencies to avoid interference and reduce the undesirable effects of multipath reflections and fading. The multiple frequencies can either be scanned until an interference free channel is found, or measurements can be made at each of the frequencies and averaged over the frequencies with have less interference.

In some embodiments, tee units are also provided, to allow a golfer to measure a drive distance by activating the ranging unit at the position of the ball after the first drive from the tee.

In another embodiment, the pin unit is an offset pin unit housed just beyond the pin and include an offset to the pin. The offset can be set by simply sending an offset signal from a standard ranging unit, or a specially configured course management unit, held at the pin. When multiple offset pin units are located at this green or on the fairway, trilateration can be used to precisely determine the location of the pin and the ranging unit relative to the offset pin unit. Then, the distance from the pin to the ranging unit is easily computed. The offset values are entered manually, via serial port on the offset pin unit, or the like, or can be programmed using a ranging unit or offset calibration unit.

A further understanding of the nature and advantages of the inventions herein may be realized by reference to the remaining portions of the specification and the attached drawings.

BRIEF DESCRIPTION OF THE DRAWINGS

FIG. 1 is a block diagram of a pin unit according to the present invention;

FIG. 10 is a timing diagram of pin unit timing.

FIG. 11 is a timing diagram of the ranging unit timing.

FIG. 12 is a timing diagram of the timing of interaction between the pin unit and the ranging unit for data collection.

DESCRIPTION OF THE PREFERRED EMBODIMENT

Figure 1A:
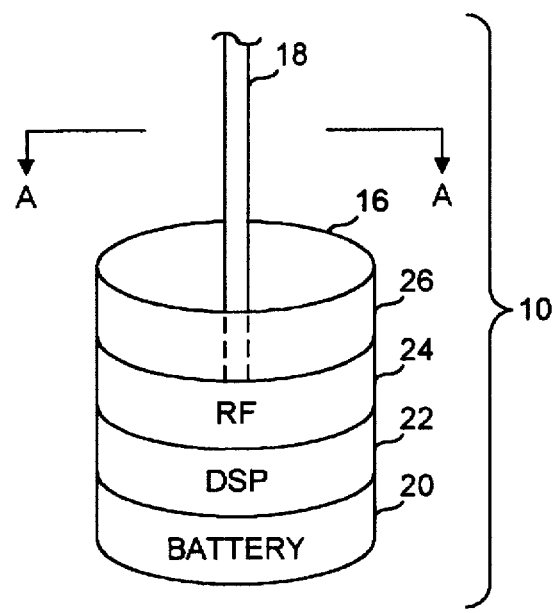
FIG. 1(a) is a perspective view of the pin unit and FIG. 1(b) is a top view of the pin unit.
Figure 1B:
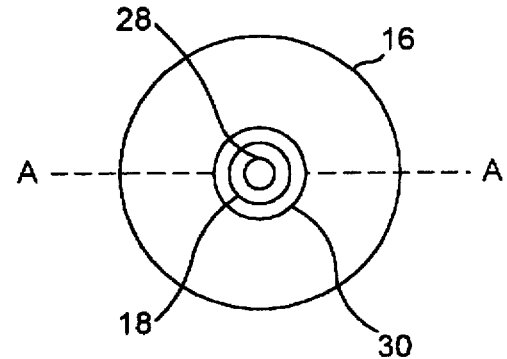

FIG. 1 is a block diagram of a pin unit 10 which is part of a golf ranging system. Pin unit 10, as shown, comprises a cup assembly 16 and a flag assembly 18. Cup assembly 16 comprises a battery compartment 20, a digital electronics compartment 22 which includes a microprocessor and digital signal processor (not shown), a radio frequency (RF) compartment 24 and a cup compartment 26. When installed, the top of cup compartment 26 is flush with the surface of the green, so compartments 20, 22 and 24 are below ground. Compartments 20, 22 and 24 need not be separate compartments, but are often isolated to avoid interference with signals from other compartments and to allow the battery to be changed while keeping the electronic compartments sealed. In one embodiment, the microprocessor and digital signal processor are combined in an application-specific integrated circuit (ASIC).

Cup assembly 16 is buried in a green, much as a conventional cup is, and cup compartment 26 serves as the cup which receives a golf ball when the ball is sunk. Flag 18 houses an antenna 28 for pin unit 10 and antenna 28 is electrically coupled to RF compartment 24 via a coupling ring 30.

Figure 2:
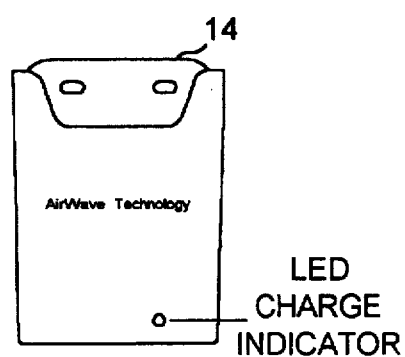
FIG. 2 is an illustration of a hand-held pin unit and chargers.

FIG. 2 shows a ranging unit 12, which includes an antenna 40, a display 42 and a variety of keys whose operation is explained below. A charger 14, adapted to accept ranging unit 12, might be located at a central, fixed location, or could be mounted on a golf cart and connected to the golf cart's electrical system. Charger 14 recharges a battery (not shown) internal to ranging unit 12.

Figure 3:
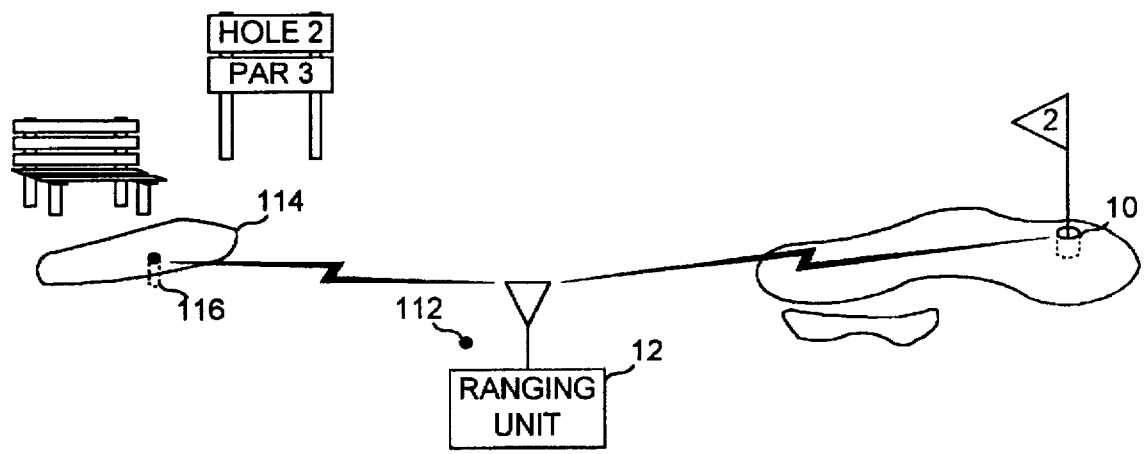
FIG. 3 illustrates one use of a ranging system to determine a distance to a pin and a distance to a tee from a golf ball lie.
Figure 4:
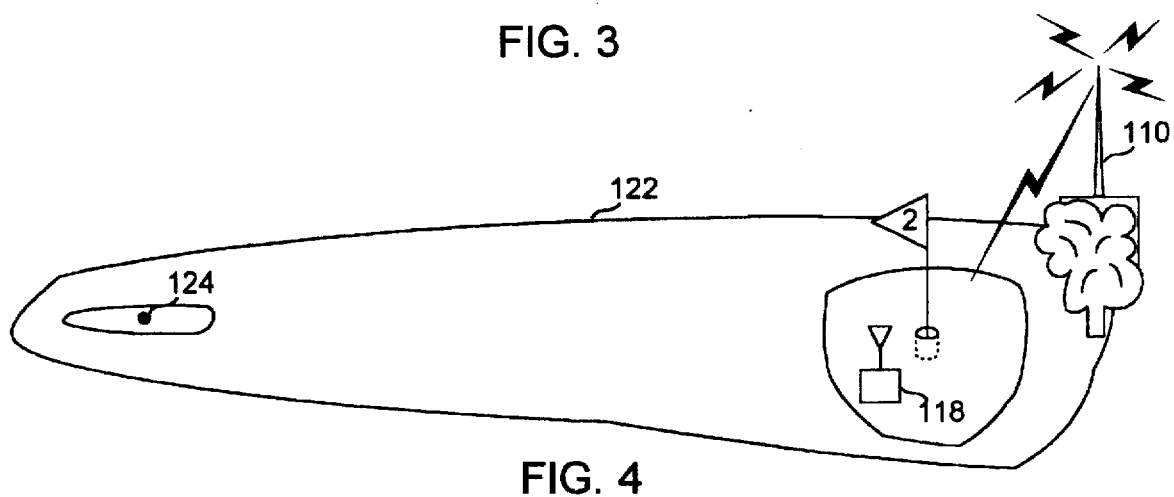
FIG. 4 is a diagram illustrating use of an offset calibration unit to provide an offset to an offset pin unit.

FIGS. 3-6 illustrate how ranging units 12 and pin units 10 are used on a golf course. The ranging unit 12 shown in FIG. 3 is positioned near a ball 112 from which distances are to be measured. Ranging unit 12, in addition to being used to determine the distance to pin unit 10 at pin #2, can be used to determine the distance to a tee such as the tee 114 for the second hole on a course by communicating with a tee unit 116 from the lie of ball 112 after the drive off tee 114. Tee unit 116 is essentially of the same construction as pin unit 10, except that the cup compartment is not needed and the antenna need not be removable.

As shown in FIG. 3, the pin unit can be an offset pin unit 110 if the conditions at the pin are not suitable for a pin unit 10 or the course managers do not want to disturb the pin. Offset pin unit 110 is calibrated by an offset calibration unit 118 positioned at the actual pin during the calibration. Offset calibration unit 118 is preferably positioned in line with the fairway 122 and the tee 124 for its hole, so that the adjustment needed to account for the displacement of the offset pin unit 110 and the actual pin is simply a subtraction of the distance from the offset pin unit 110 to the actual pin. Offset calibration unit 118 might be simply a ranging unit 12 appropriately programmed to transmit an offset distance value to offset pin unit 110. Of course, where multiple offset pin units are used per hole, the offset pin units need not be aligned with the fairway, tee, or other landmark.

Figure 5:
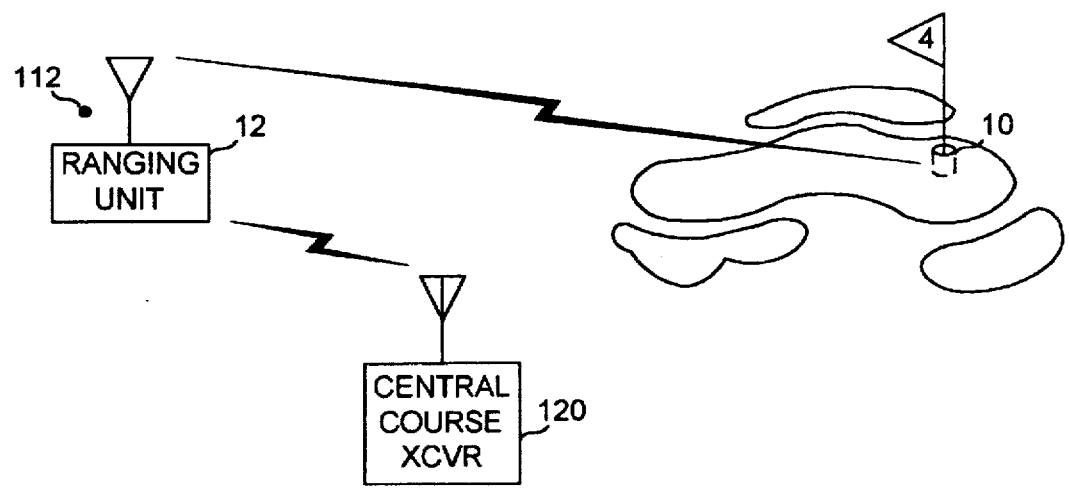
FIG. 5 is an illustration of the use of a ranging unit to range from a ball lie to a pin and to communicate with a central course transceiver.

As shown in FIG. 5, each ranging unit 12 might also be equipped to communicate with a central course transceiver 120, to update a course operator on the position of the golfers and for two-way voice communications. Such voice communications would be convenient for golfers to call in for emergency service or food services and for the course operator to contact the golfers out on the course.

Figure 6:
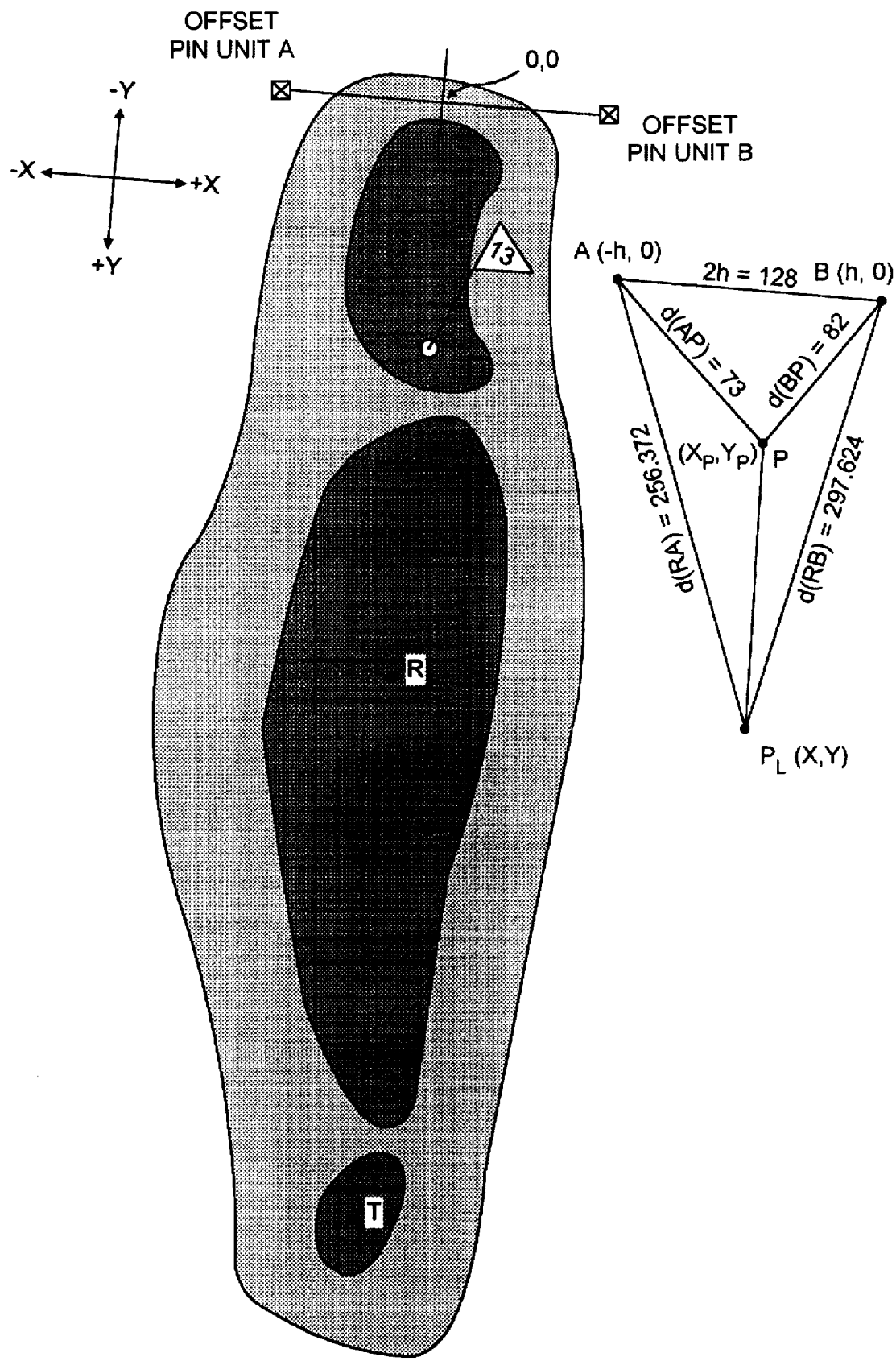
FIG. 6 is an illustration showing how distance from a golf ball lie and a pin is determined by using trilateration with distances provided by two or more offset pin units.

FIG. 6 illustrates the use of multiple offset pin units. The layout for the 13th hole on a course is shown. Along with a pin (P), a tee (T) and a ball position to be ranged from (R). In this example, two offset pin units, A and B, are shown. When the offset pin units are first installed or pin P is moved the offset pin unit are programmed with an offset calibration unit, or programmed manually, with an offset which indicates the position of pin P relative to the particular offset pin unit. In a ranging process, a ranging unit at position R ranges to the two offset pin units (or more than two offset pin units if more than two are provided). In addition to obtaining range information indicating the distances between point R and the offset pin units, the offset pin units provide the offset information indicating the relative positions of offset pin unit A and offset pin unit B and the relative position of pin P to each of the offset pin units. From this data, the distance from point R to pin P can be calculated.

The calculation of distance between pin P and point R is illustrated by the following equations. Suppose that two offset pin units are used. These define a coordinate system wherein (−h, O) is the position of offset pin unit A and (+h, O) is the position of offset pin unit B. Herein, (x, y) refers to the position of the point R to be ranged from and (Xp, Yp) refers to the position of pin P. During initialization of the offset pin units, either when first installed or when pin P is moved, offset calibration unit 118 is held at one offset pin unit to get the distance, 2h, between the offset pin units. Offset calibration unit 118 is then taken to pin P, where ranging is performed to each of the offset pin units to obtain the distance, d(AP), from offset pin unit A to pin P and the distance, d(BP), from offset pin unit B to pin P. Using standard formulae for trilateration:

$$d(AP)^2 = (X_p - (-h))^2 + (Y_p - O)^2$$

$$d(BP)^2 = (X_p - h)^2 + (Y_p - O)^2$$

and solving for $X_p$ and $Y_p$ leads to:

$$X_P = \frac{d(AP)^2 - d(BP)^2}{4h}$$

$$Y_P = \pm \sqrt{d(BP)^2 - (X_p - h)^2}$$

This, of course, provides two solutions, one on each side of the line segment between the offset pin units. The ambiguity can be resolved by providing either the ranging unit or the offset pin units with information about where the pin can and can't be, such that only one value for Y is valid. In the case shown in FIG. 6, only the positive Y value is valid. Once the location of the pin relative to the offset pin units is determined, this offset is communicated to the offset pin units.

Once the offset pin units are programmed with the offset, they can be used to provide location information to a ranging unit held at a ball's lie. In FIG. 6, the ball's lie is indicated by "R", the point to be ranged to. The setup process can also be used to provide the offset pin units with the coordinates for other non-pin objects, such as sand traps, water hazards, and other objects. If the ranging distances between R and offset pin units A and B are d(RA) and d(RB), respectively, the coordinates of R relative to the coordinate system used for pin P are:

$$X_P = \frac{d(AR)^2 - d(BR)^2}{4h}$$

$$Y = \pm \sqrt{d(BR)^2 - (X-h)^2}$$

This also leads to an ambiguity because of the two solutions and can similarly be resolved by setting valid ranges for R. Another way to resolve the ambiguity is to use a third offset pin unit. With a third pin unit, suitably located, the third pin unit can provide another data point which can be used to resolve the sign of the value for Y in addition to providing corroborating data for the values of X and Y. A pin unit for another hole might serve as the third offset pin unit for the current hole. Once the positions of pin P and lie R are known relative to the coordinate system, the distance to the pin from the lie is simply:

$$d_{RP} = \sqrt{(X_P - X)^2 + (Y_P - Y)^2}$$

FIG. 6 also shows an example of the ranging process with the actual numbers. During initialization, the values of h, d(AP) and d(BP) were determined to be 64, 73 and 82, respectively (in feet). The ranging unit measures distances in discrete units (counts) where one count is a half a cycle of a 40 MHz clock, or 12.5 nsec, which is 12.25 feet at the speed of light. The offset pin units provide either the values for h, D(AP) and (BP) or the coordinates of the pin ($X_p$, $Y_p$) to a ranging unit in a ranging process. As part of the ranging process, d(RA) and d(RB) were determined to be 256.372 feet and 297.624 feet, respectively. The resolution of the readings can be greater than 12.25 feet increments because many readings are taken. Using a third offset pin unit or known constraints, it was determined that $Y_p$ and Y have the same sign. Thus, the distance from ($X_p$, $Y_p$) to (X, Y) is calculated from the above equations as follows (in feet):

$$X_P = \frac{73^2 - 82^2}{4 \cdot 64} = -5.449$$

$$Y_P = \sqrt{73^2 - (-5.449 - (-64))^2} = 43.598$$

$$X = \frac{256.372^2 - 297.624^2}{4 \cdot 64} = -89.271$$

$$Y = \sqrt{256.372^2 - (-89.271 - (-64))^2} = 255.123$$

and $$d(RP) = \sqrt{(-5.449 - (-89.271))^2 + (43.598 - 255.123)^2} = 227.528$$

Figure 7:
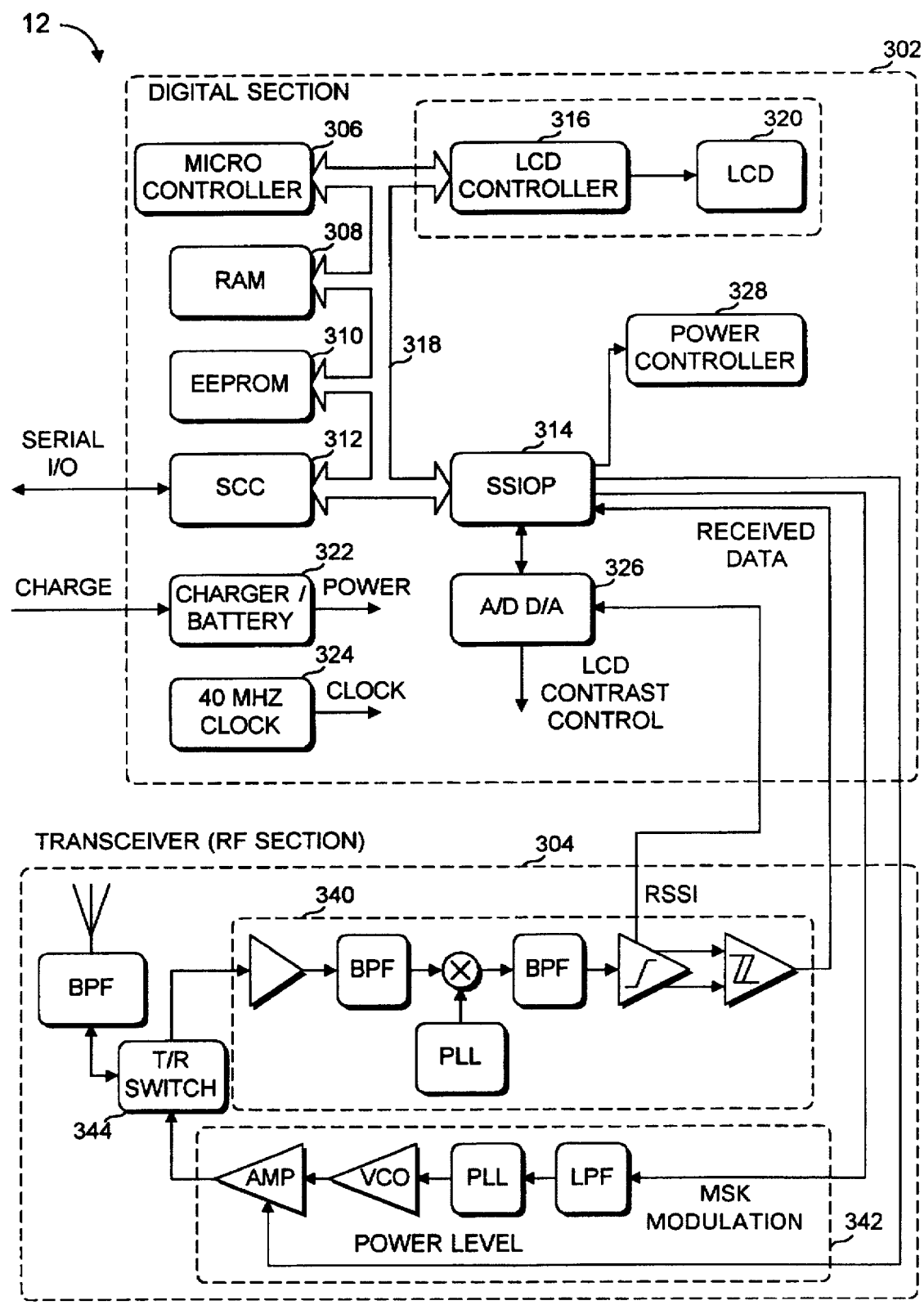
FIG. 7 is a block diagram of the circuitry of the ranging unit.

FIG. 7 is a block diagram of the internal circuits of ranging unit 12, shown divided into a digital section 302 and a transceiver 304. Transceiver 304 handles the actual communications between ranging unit 12 and pin units 10 and central course transceiver 120, while digital section 302 generates and handles the data sent and received.

The digital section 302 comprising a microcontroller 306, RAM (random access memory) 308, EEPROM (electrically erasable programmable read-only memory) 310, a serial communications controller (SCC) 312, a spread spectrum I/O processor (SSIOP) 314 specifically designed for this application, and an LCD controller 316 are all coupled together by a bus 318. LCD controller 316 controls an liquid crystal display (LCD) 320. Digital section 302 also includes charger/battery circuit 322, a clock circuit 324, an A/D-D/A system 326 and a power control circuit 328, which are each used as needed.

Charger/battery circuit 322 stores charge provided by charger 14 and supplies power to the various circuits in ranging unit 12. Clock circuit 324 provides a clock for various timing elements of circuits, such as the clocks to microcontroller 306, A/D-D/A 326, and SSIOP 314. The clock used for sampling the received, encoded signal is a 40 MHz clock, providing a 12.5 nsec resolution. A/D-D/A 326 digitizes a RSSI (Received Signal Strength Indicator) signal received from RF section 304 as well as other signals which need to be converted between analog signals and digital signals. The RSSI signal is used to determine whether a given frequency band is in use. Power control circuit 328 places various circuit elements in low power "sleep" modes as indicated by their lack of activity. A ranging unit is programmed to power down 60 or more seconds after the last key is pressed and a pin unit is programmed to power up periodically and look for a signal. If a signal is not found, the pin unit powers down again and waits, otherwise it proceeds to establish communications with the ranging unit sending the signal.

Microcontroller 306 is an 80C188 microcontroller manufactured by Intel Corporation of Santa Clara, Calif., AMD of Sunnyvale, Calif., or the like. The 80C188 includes power-save circuitry and includes timers, I/O ports and the like. EEPROM 310 contains the program code for microcontroller 306. In one embodiment, EEPROM 310 is 128 KB with eight separately reprogrammable "pages" of 16 KB each. With separately reprogrammable pages, the program code might reside on pages separate from configuration data and serial numbers and the like. Of course, EEPROM 310 can be replaced by EPROM or PROM, depending on the manufacturing process. RAM 308, in one embodiment, is 32 KB of static RAM whose contents are preserved as long as battery power is available.

SCC 312 contains two channels, one to allow for software downloads for reprogramming EEPROM 310 and one for framing and recovering data to and from transceiver 304. SCC 312 also provides CRC (cyclic redundancy check) error detection.

SSIOP 314 handles the interface between microcontroller 306 and transceiver 304, and contains two independent code generators, a correlator, a digital phase lock loop (DPLL), time code counters, phase counters and data recovery circuits. SSIOP 314 also contains DMA and peripheral timing circuits for collecting and displaying the ranging data via LCD controller 316.

The two code generators are used for coding the signal to be transmitted and for decoding the received signal. The transmitter code generator is clocked by a fixed frequency oscillator. In the receiver, the DPLL is used to synchronize the receiver code generator to the received signal. Once the receiver code generator is synchronized, or locked onto the coded, received signal, then the received signal can be decoded.

The DPLL operates in three modes: acquire, track and hold. In acquire mode, the DPLL shifts the receiver code generator until the receiver code generator is synchronized, or correlated, to the received signal. In the track mode, the DPLL is used to maintain the synchronization of the receiver code generator with the received signal. Synchronization is maintained by constantly maximizing the output of the correlator. And, in the hold mode, the DPLL simply runs at a fixed frequency.

Using the 40 MHz clock 324, the received code generator can be locked onto the coded, received signal with 12.5 nsec accuracy. Because the RF signal travels at the speed of light, this corresponds to a single measurement error of 4 yards.

By taking multiple measurements and applying statistical processing methods, the measurement error can be reduced to 1 yard or less.

Figure 9:
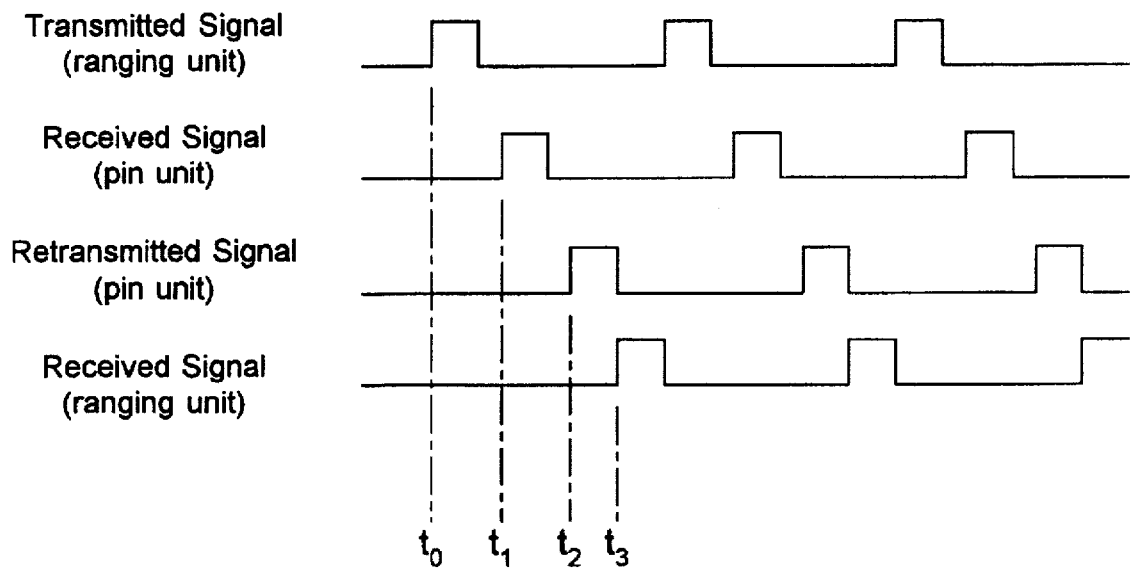
FIG. 9 is a timing diagram of the ranging operation.

In the application of ranging unit 12 as shown in FIG. 9, ranging unit 12 transmits a coded signal. The signal transmitted from the ranging unit 12 is coded using its transmitter code generator. The DPLL and receive code generator in pin unit 10 sequence through their three operating modes: Acquire, Track and Hold. Once in the hold mode pin unit 10 uses its receive code generator to code and transmit a signal back to ranging unit 12. The receive code generator in ranging unit 12 acquires and tracks the signal being sent from pin unit 10. Then, the digital circuits in ranging unit 12 measure the time difference between the receiver code generator of the ranging unit 12 and transmitter code generator of ranging unit 12. This time difference is used to calculate the distance between ranging unit 12 and pin unit 10 as described above.

Transceiver 304 shown in FIG. 7, comprises a receiver 340, a transmitter 342 and a transmit/receive switch 344. Receiver 340 receives an RF signal from switch 344 and outputs the RSSI signal and the received spread-spectrum signal to digital section 302. Digital section 302 sends a power level control signal to a transmitter amplifier and an encoded data signal, which is a spread-spectrum signal. Switch 344 can be set in a loop-back mode, so that the ranging unit's transmitter transmits to its receiver. In the loop-back mode, the unit is able to calculate the total group delay of the transmitter and receiver pair. This is useful in that the unit's internal group delay needs to be subtracted out of the total signal delay from the ranging unit to the pin unit and back.

Figure 8:
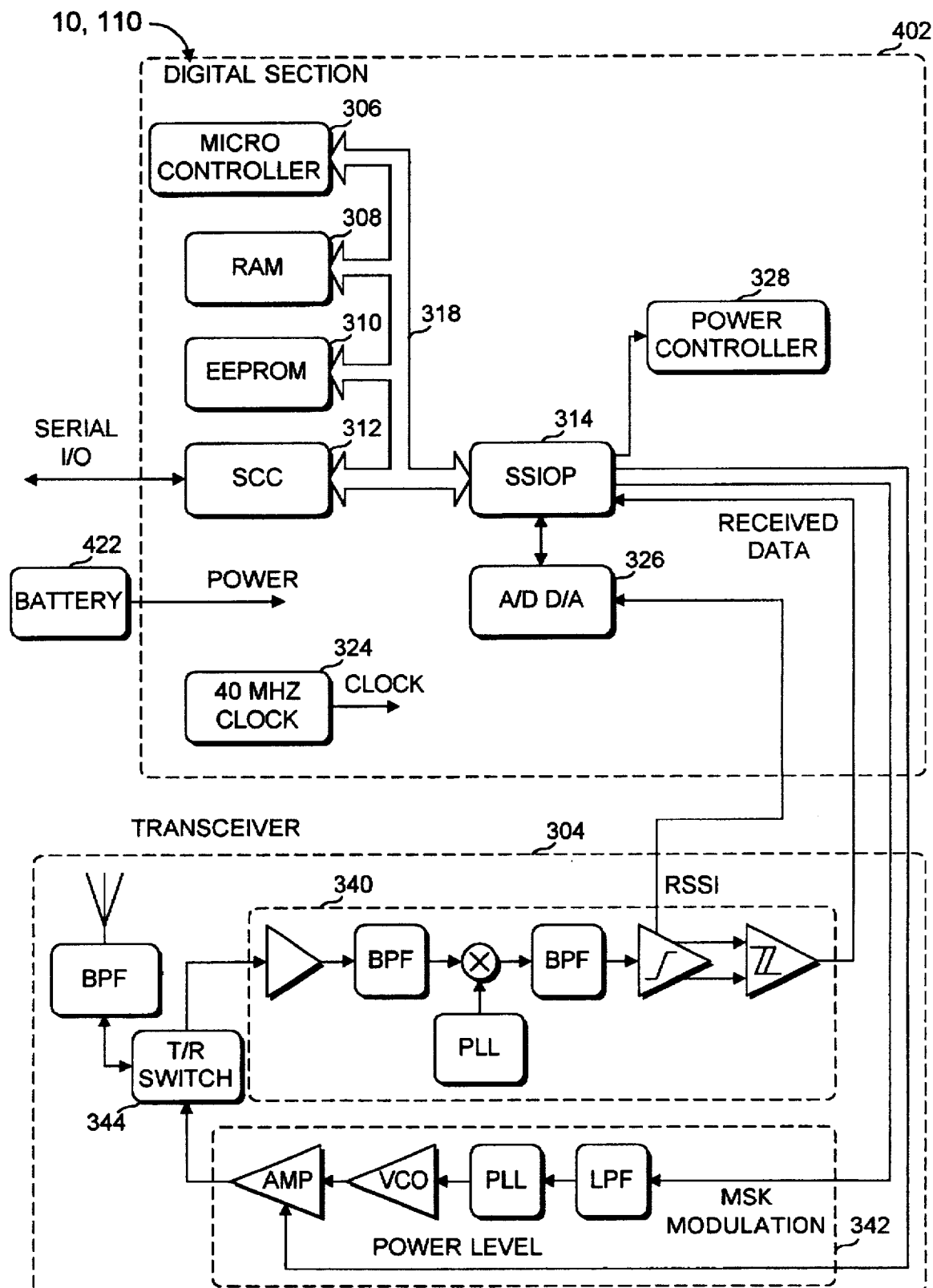
FIG. 8 is a block diagram of the circuitry of the pin unit.

FIG. 8 is a block diagram of the internal circuits of a pin unit, such as pin unit 10, tee unit 116 or offset pin unit 110 (generically referred to as "pin units"). Each of these units use the same electronics, except that an offset pin unit might use a power line if they are convenient, other non-battery power sources such as solar cells, or some combination thereof. The only difference in the electronics is in configuration values. For example, if a flag in EEPROM 310 is used to indicate whether a particular unit is a pin unit or a tee unit, that value would be different from a pin unit to a tee unit, or if a memory location in RAM 308 is set aside for an offset value, that offset value would be fixed at zero for a pin unit but set to some nonzero value for an offset pin unit. Presumably, a tee unit also has a nonzero offset value unless it is installed directly under the tee.

For simplicity, pin units have most of the same hardware as ranging units 12. Ranging units have key pads and displays but these are not present in pin units, since they are generally inaccessible. Of course, the programs running on the microcontrollers in pin units are different than the programs for a ranging unit. The distinctions are discussed in more detail below, in the description of FIG. 13.

The pin unit includes timers for power management. In one embodiment, the timers cause the pin unit to power up several times per second and stay on for many milliseconds (msec) to check if a signal is present. If a signal is present, the pin unit stays on until the ranging operation completes. Power is provided by a battery 422. With power management, the pin unit will not immediately respond to a ranging signal sent by a ranging unit but will activate the various circuits before responding. This saves considerable battery power, since the pin unit need only be active for several seconds total over the time period in which a hole is played, which can be fifteen or twenty minutes.

The mechanical assemblies of pin units and ranging units are, of course, different, as is shown in FIG. 1.

FIG. 9 is a timing diagram of a ranging operation. The first signal shown in FIG. 9 is the transmitted signal sent from a ranging unit to a pin unit. The second signal shown in the signal received at the pin unit, which is the transmitted signal delayed by the transit time between the ranging unit and the pin unit. The third signal shown is the signal transmitted by the pin unit in response to receiving the second signal. The last signal shown is the signal received by the ranging unit. A rising edge of the first signal is designated $t_0$. After a transit time, the rising edge is received at the pin unit at time $t_1$. Following a pin unit processing period and a group delay time, the rising edge (or a rising edge corresponding thereto) is emitted from the pin unit at time $t_2$. That returned rising edge is received by the ranging unit at $t_3$. Since the pin unit is able to calculate its own turnaround time, $t_r = t_2 - t_1$, and transmit that value along with the return signal, the ranging unit can calculate the distance to the pin unit from the total delay $t_3 - t_0$. Specifically, the ranging unit calculates:

$$d = c*(t_3 - t_0 - t_r)/2$$

where c is the speed of light and the time is divided by two since it is a round trip time.

FIG. 10 is a timing diagram that illustrates the power management timing of a pin unit. In one embodiment, a pin unit, when not active, repeats a listen/sleep cycle every 510 msec. In FIG. 10, the start of a listen period is arbitrarily selected as the start of the cycle. In the first 5 msec of the listen period, the pin unit powers up the necessary circuits and tunes receiver 340. Then for the remaining 105 msec of the listen period, the pin unit listens for incoming signals. If a signal is detected and it is addressed to the pin unit, the pin unit responds. Otherwise, the pin unit goes to a sleep period for 400 msec and then the cycle repeats. The signals from a ranging unit include a signal indicating which pin unit the ranging unit is querying. The pin unit compares this value to a serial number stored in EEPROM 310 to determine if it is the selected pin unit.

FIG. 11 is a timing diagram that illustrates the timing of a ranging unit during a handshake process. In one embodiment, at the start of the handshake process, the ranging unit tunes its transmitter for 5 msec, then transmits a handshake packet (25 msec). The ranging unit then listens for a response. The response period lasts for 77 msec, with the first 5 msec of that being used for receiver tuning. If the selected pin unit does not respond, the ranging unit repeats the transmit/listen cycles again up to 15 times before giving up and displaying an error message.

FIG. 12 is a timing diagram which illustrates the timing of the ranging unit and the pin unit once the handshake is complete. The ranging unit transmits data to the pin unit while the pin unit listens, then the pin unit transmits while the ranging unit listens. Each transmitting or receiving period begins with a 5 msec tuning period. The data transmitted includes the protocols for selecting the pin unit.

Figure 13:
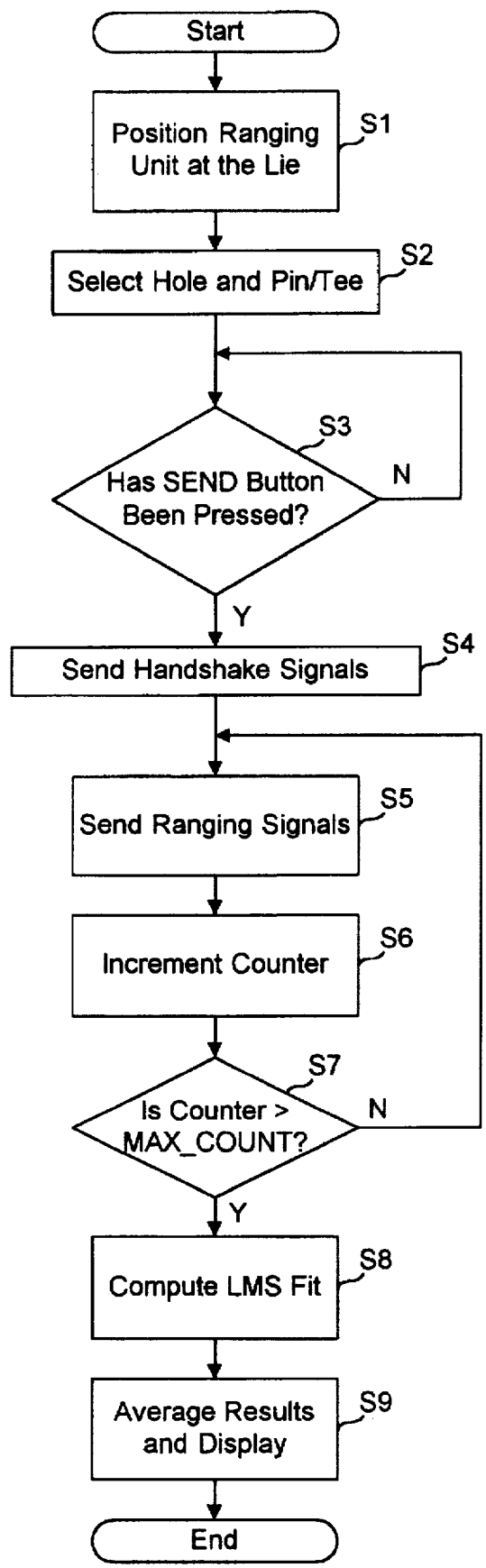
FIG. 13 is a flowchart of a ranging operation.

FIG. 13 is a flow chart of a ranging operation between a ranging unit and a pin unit, such as ranging unit 12 and pin unit 10, tee unit 116 or offset pin unit 110. The ranging operation begins with a golfer positioning the ranging unit at the lie position (of course, the distance from any point other than a lie position could be equally well measured). This step is designated S1 in FIG. 13 and the designations of other steps are shown herein in parentheses.

Once positioned, the golfer selects the hole for which the measurement is to be made (S2) and presses the "SEND" button on the ranging unit. Of course, the selection could be made before being positioned and could be made automatically. The ranging unit could do automatic hole selection by tracking which hole selection the golfer made previously or ranging to a plurality of course-wide, fixed transponders to determine a position within the course and from that position determine which hole is currently being played. In such a system, however, a golfer should be allowed to override the default automatic selection in cases where a ball is hit onto the fairway of a hole not being played. The selection of pin or tee is also made by the golfer, if the ranging system is set up to determine drive distance as well as distance to the pin. Alternatively, the ranging unit could send both a pin unit ranging signal and a tee unit ranging signal each time.

When the golfer presses the SEND button (S3), the ranging unit transmits handshake signals (S4) as per FIGS. 10-11. Once the handshake is complete, the ranging unit and the pin unit begin the ranging process (S5). After a single ranging cycle, the ranging unit has a measurement of the distance to the pin unit with a resolution of 12.5 nsec (about 4 yards). To increase the resolution of the measurement, the units will repeat the measurement MAX_COUNT times, by incrementing a counter (S6) and testing whether the counter exceeds MAX_COUNT (S7). Typical values for MAX_COUNT might range from 10 to 3000. Additionally, measurements may be made at different frequencies to reduce multi-path and ground wave effects.

Once MAX_COUNT measurements are made, the ranging unit computes a least means squared value for the measurements and averages (S9) and displays the result (S8), rounded to the nearest whole yard. At this point, the ranging unit and pin unit are ready for additional measurements.

If the ranging unit determines that the ranging signals are subject to interference or might be taken along a reflection path (which would provide too high an estimate of the distance), the ranging unit will switch to another frequency within the first communicating the new frequency to the pin unit. In an alternative embodiment, the ranging unit might, as a matter of course, take measurements at more than one frequency to determine the most reliable frequency. For example, if ranging in done at four frequencies and the measurement at one frequency was much larger than the measurement at the other three frequencies, the larger measurement can be discounted as being a measurement along a path of reflection. In the United States, the 902-928 MHz band might be used.

Figure 14:
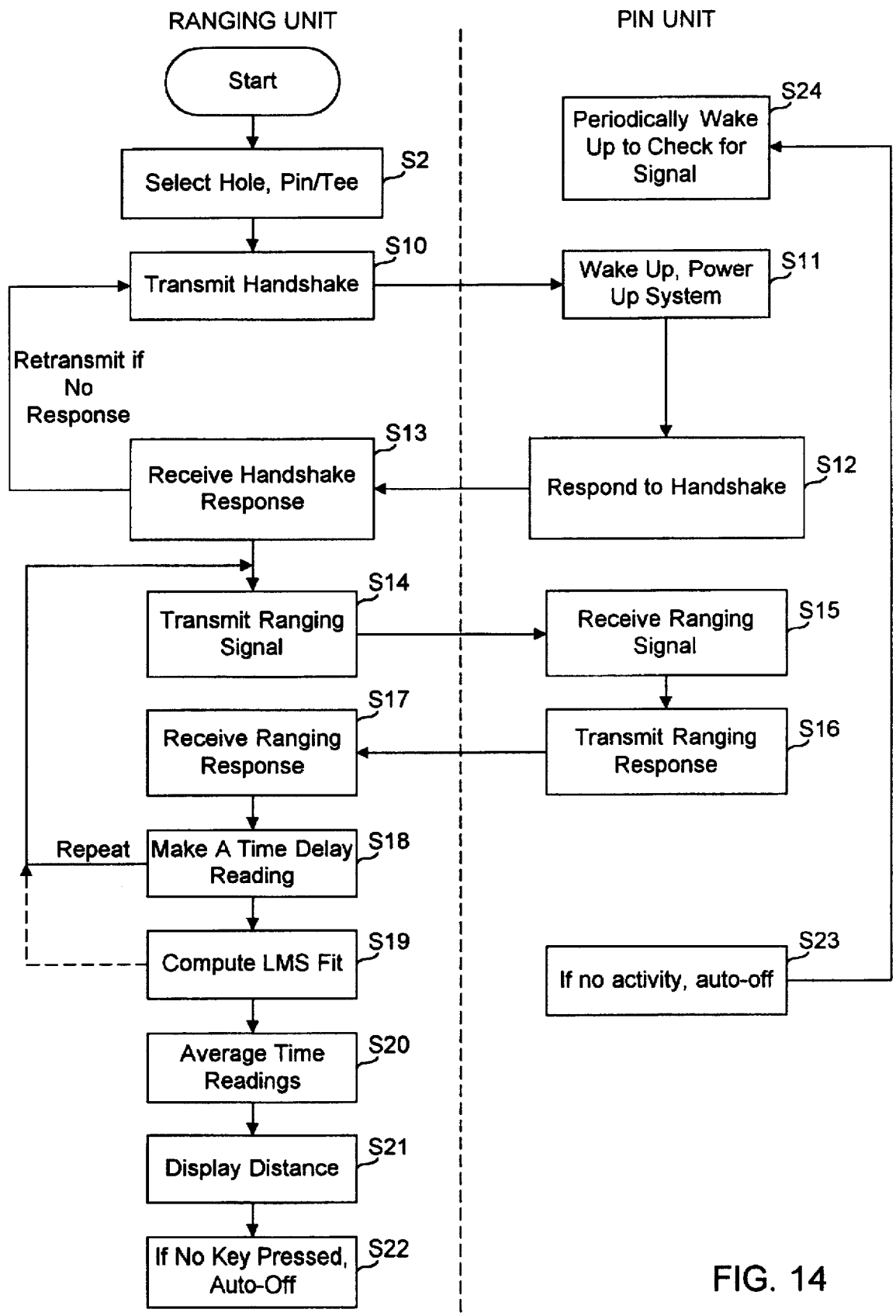
FIG. 14 is a flowchart illustrating the separate operations of a ranging unit and a pin unit in a ranging operation.

FIG. 14 is a flowchart showing the separate operations performed by a ranging unit 12 and a pin unit 10. The process begins when a golfer, using ranging unit 12, selects the hole and pin or tee. In this description, we assume that the pin unit for hole #16 was selected. In the next step (S10), ranging unit 12 transmits a handshake signal and displays a message on display 42 such as "Pin 16—Sending". This handshake signal includes an indication that the pin unit for Hole #16 was selected. The handshake signal might also include non-ranging signals, such as a status query of pin unit 10.

The receipt of the handshake signal (S11) at pin unit 10 during the "listen" period shown in FIG. 10 causes pin unit 10 to wake up and power up its digital electronics compartment 22. Once powered up, pin unit 10 sends out a handshake response signal (S12) if pin unit 10 determines that the handshake signal was directed to it. At this point, ranging unit 12 is waiting and listening for a response as shown in FIG. 11 (the "RX" period). When it receives the response (S13), it proceeds to the next step (S14). If a response is not received after a waiting period, ranging unit returns to step S10, where it repeats the sending of the handshake signal.

After a set number of tries at transmitting them then listening (as shown in FIG. 11), ranging unit 12 gives up and displays the error message "No Reply".

At step S14, ranging unit 12 transmits a coded ranging signal. Pin unit 10 receives and decodes the coded ranging signal (S15). In step S16, pin unit 10 transmits its ranging response. The ranging response contains time code information, as well as status information, as well as status information and identification information. Additionally, the ranging response contains a value indicating the group delay of pin unit 10. This data required to compute the distance from ranging unit 12 to pin unit 10. When ranging unit 12 receives the ranging response (S17), its digital circuits measure the time shift between the transmitter code generator and the receive code generator in ranging unit 12 (S18). The measurement timing from S14 to S17 is shown graphically in FIG. 9. Each coded bit contains an epoch. The ranging unit transmitted signal epoch is shown on the first line of FIG. 9. This signal is transmitted in S14. The epoch is received by pin unit 10 (S15). It is temporally delayed. The delay is proportional to the distance between ranging unit 12 and pin unit 10. Pin unit 10 locks onto the signal using DPLL. The pin unit's DPLL is then placed into the HOLD mode, and the pin unit begins transmitting back to the ranging unit (S16). The ranging unit locks onto the signal using its DPLL (S17). The ranging unit then measures the time delay between its transmitted signal epoch and its received signal epoch. The rime delay is equal to two times the distance between the raging unit and the pin unit divided by the velocity of the signal, the speed of light.

The crystal in ranging unit 12 drifts with respect to the crystal in pin unit 10 because neither the crystal in ranging unit 12 nor the crystal in pin unit 10 are perfectly accurate. In this embodiment, a Least Means Squared (LMS) algorithm is used to measure and compensate for crystal drift (S19). The data used to feed the LMS algorithm is the time code information contained in the ranging response and a series of time measurements made between the ranging unit's transmitter code generator and its receive code generator. At step 20, the LMS measurement is averaged with other LMS measurements, to arrive at an average distance.

Following the display of a distance or an error message, ranging unit 12 powers down after a preset time period if no key is pressed (S22). Similarly, after a period of inactivity at pin unit 10, it powers down (S23) and periodically wakes up (S24) to check if a handshake signal is present (as shown in FIG. 10).

In summary, the above detailed description shows how the present invention is used on a golf course to measure distances from ranging units to pin units or tee units. Where the ranging unit is placed at the lie of the golfer's ball, the ranging unit will report the distance from the ball to the pin, in the case of pin units, or the length of a drive, in the case of a tee unit. Where an offset pin unit is used, an offset from the offset pin unit to the pin is recorded at the pin unit using an offset calibration unit 118 positioned at the pin for measurement. The above description also shows how spread spectrum signals from ranging units to pin units or tee units, along with data signals encoded thereon, are used for ranging and communications.

Aside from providing distance measurements from a lie position to a pin, the ranging system, in a more integrated embodiment, stores the position of the ball after each shot and the data for an entire round of golf may be downloaded through an added electronic signal interface (such as a serial port connector) on the ranging unit, thereby allowing the data for a round of golf to be downloaded to a personal computer, or the like, for the purposes of game analysis and simulation. If the course layout of the course for which a golf round data set was obtained is available for the computer golf simulation program, the actual shots of the golfer could be simulated, displayed and further analyzed.

It would be apparent, after reading the description of the ranging system, that other variations are possible. For example, the frequency band used for ranging and handshake signals might be the unlicensed, spread spectrum band of 902 to 928 MHz for use on golf courses in the United States. In Europe and Asia, the 2,400 GHz band might be used. As explained above, some course managers may object to placing the electronics shown in FIG. 1 below a pin because of environmental conditions or official golfing regulations. In those situations, 1, 2, or more, offset pin units may be used per hole. Where an offset pin unit is used for more than one hole, it may contain entirely separate electronics for each of the holes, or it may be programmed to respond to handshake signals direct at more than one pin. In such a case, the offset pin unit would store offsets for each of the pins for which it is an offset pin unit. Typically, however, each hole will have its own set of offset pin units, unless the pins for two or more holes are near each other.

Where course obstacle might obscure a direct radio path between a lie position and a pin, repeaters might be used to relay a signal around the obstacle. The repeaters might also themselves be used as offset pin units.

As explained above, a single distance measurement will typically comprise multiple readings. In a specific embodiment, nine to sixteen distance measurements are made and averaged to arrive at a single distance measurement. This averaging lowers the quantization error and thereby increases the accuracy of the system. Three to four distance measurements are made at each of three to four frequencies. For each measurement, the ranging signal is transmitted, and received, fifteen times by the ranging unit and the pin unit. Each time the ranging unit is sent, twenty epoch measurements are made. Therefore, for each distance measurement displayed to the golfer, 2700 to 4800 individual epoch measurements are made and processed.

The above description is illustrative and not restrictive. Many variations of the invention will become apparent to those of skill in the art upon review of this disclosure. For example, ranging units might be attached to golf carts, or might operate at a different set of frequencies. The code sequences may vary. The scope of the invention should, therefore, be determined not with reference to the above description, but instead should be determined with reference to the appended claims along with their full scope of equivalents.

What is claimed is:

1. An electronic golf course ranging apparatus for determining a distance to a pin selected among pins of holes of a golf course, wherein a golfer's lie is a current position of a golf ball and the selected pin is a current target pin for the golfer, the apparatus comprising:

a hand-held golfer unit which is positionable near the golfer's lie, the hand-held golfer unit including:

a ranging transceiver activated by the golfer to send a direct sequence spread spectrum (DSSS) ranging signal to the selected pin;

a processor coupled to the ranging transceiver;

a plurality of offset pin units disposed about the selected pin, the offset pin units including digital circuitry coupled to a pin transceiver that receives the DSSS ranging signal, the digital circuitry being operable to acquire, track and hold the DSSS ranging signal, and to code and transmit a DSSS return signal back to the remote transceiver of the hand-held golfer unit; and wherein the processor calculates ranging distances from the hand-held unit to each of the offset pin units utilizing time differences between the DSSS ranging signal and the DSSS return signal received by the hand-held unit, the distance to the pin from the golfer's lie being computed by the processor utilizing the ranging distances and a formula.

2. The electronic golf course ranging apparatus of claim 1, wherein the plurality of offset pin units comprises first and second offset pin units, the DSSS return signal includes first, second, and third calibration distances between the first offset pin unit and the pin, the second offset pin unit and the pin, and the first and second offset pin units, respectively; and wherein the formula comprises a trilateration formula.

3. The electronic golf course ranging apparatus of claim 1, wherein the plurality of offset pin units comprises a third offset pin unit.

4. An electronic golf course ranging apparatus for determining a distance to a pin selected among pins of holes of a golf course, wherein a golfer's lie is a current position of a golf ball and the selected pin is a current target pin for the golfer, the apparatus comprising:

a golfer unit which is positionable near the golfer's lie, the golfer unit including a means for indicating the selected pin, the golfer unit comprising:

means for transmitting a ranging signal, the ranging signal including at least a pin selection signal;

a plurality of pin units, wherein a pin unit is positioned at the selected pin, and the pin unit comprises:

means for receiving the ranging signal at the pin;

means for processing the ranging signal to isolate the pin selection signal;

a pin unit identifier which provides an electronically-readable indication of an identifier uniquely identifying the pin unit from the pin units within the range of the golfer unit;

a means for comparing the pin unit identifier with the pin selection signal; and means for transmitting a response signal to the golfer unit in response to receipt of a pin selection signal matching the pin unit identifier; and means for calculating the distance to the pin unit from a time delay between the transmission of the ranging signal and the receipt of the response signal, wherein the ranging signal and the response signal are transmitted in a plurality of frequency bands and the means for calculating the ranging distance discounts measurements taken at frequencies subject to interference.

5. The apparatus of claim 4, wherein the time delay comprises a least mean squared fit mapping of repeated time delay measurements.

6. An electronic golf course ranging apparatus for determining a drive distance from a selected tee to a golfer's lie, wherein the golfer's lie is a current position of a golf ball following a drive and the selected tee is a point of origination of the drive, the apparatus comprising:

a golfer unit which is positionable near the golfer's lie, the golfer unit including:

a ranging transceiver activated by the golfer to send a direct sequence spread spectrum (DSSS) ranging signal to the selected tee;

a processor coupled to the ranging transceiver;

a tee unit positioned at the selected tee, the tee unit including:

a tee transceiver that transmits a DSSS response signal to the golfer unit in response to the DSSS ranging signal; and wherein the processor calculates the drive distance from the golfer unit to the tee unit from a time delay between the transmission of the DSSS ranging signal and the receipt of the DSSS response signal, the processor being operable in a loop-back mode to calculate an internal signal delay which is subtracted from the time delay to determine the drive distance;

and wherein the tee and ranging transceivers operate in a plurality of frequency bands.

7. A golf course ranging system comprising:

a pin unit located at a golf hole, the pin unit having a transceiver section coupled to a digital electronics section, the digital electronics section including a processing unit that encodes spread spectrum transmit signals and decodes spread spectrum receive signals, the pin unit also including a power control circuit that manages power by placing the pin unit in either an active or a sleep mode of operation;

a ranging unit also having a transceiver section coupled to a digital electronics section, the digital electronics section including a processing unit that encodes spread spectrum transmit signals and decodes spread spectrum receive signals;

in response to a handshake signal transmitted by the ranging unit, the power control circuit placing the pin unit in the active mode of operation and transmitting a handshake response signal, after receiving the handshake response signal the ranging unit transmitting a first ranging signal at a first epoch, $t_1$, responsive to the first ranging signal the pin unit transmitting a second ranging signal that includes a group time delay, $t_r$, of the pin unit, the second ranging signal being received by the ranging unit at a second epoch, $t_2$;

wherein a golf distance, d, from the ranging unit to the golf hole is calculated as $$d = c(t_2 - t_1)/2$$

where c is the speed of light.

8. The golf course ranging system of claim 7 wherein the pin unit is disposed in a cup of the golf hole.

9. The golf course ranging system of claim 8 wherein the pin unit is disposed an offset distance from the golf hole, the pin unit being calibrated such that the golf distance accounts for the offset distance.

10. A golf course ranging system comprising:

first and second pin units located first and second offset distances, respectively, from a golf hole, each pin unit having a transceiver section coupled to a digital electronics section, the digital electronics section including a processing unit that encodes spread spectrum transmit signals and decodes spread spectrum receive signals;

a ranging unit also having a transceiver section coupled to a digital electronics section, the digital electronics section including a processing unit that encodes spread spectrum transmit signals and decodes spread spectrum receive signals;

in response to a first ranging signal at a first epoch, transmitted by the ranging unit, the first and second pin units transmitting second and third ranging signals, respectively, that includes a value indicative of the first and second offset distances, the second and third ranging signals being received by the ranging unit at second and third epochs, respectively;

wherein a golf distance from the ranging unit to the golf hole being calculated from a first delay between the second and first epochs, a second delay between the third and first epochs, and the value, according to a trilateration formula.

* * * * *